UNITED STATES PATENT OFFICE.

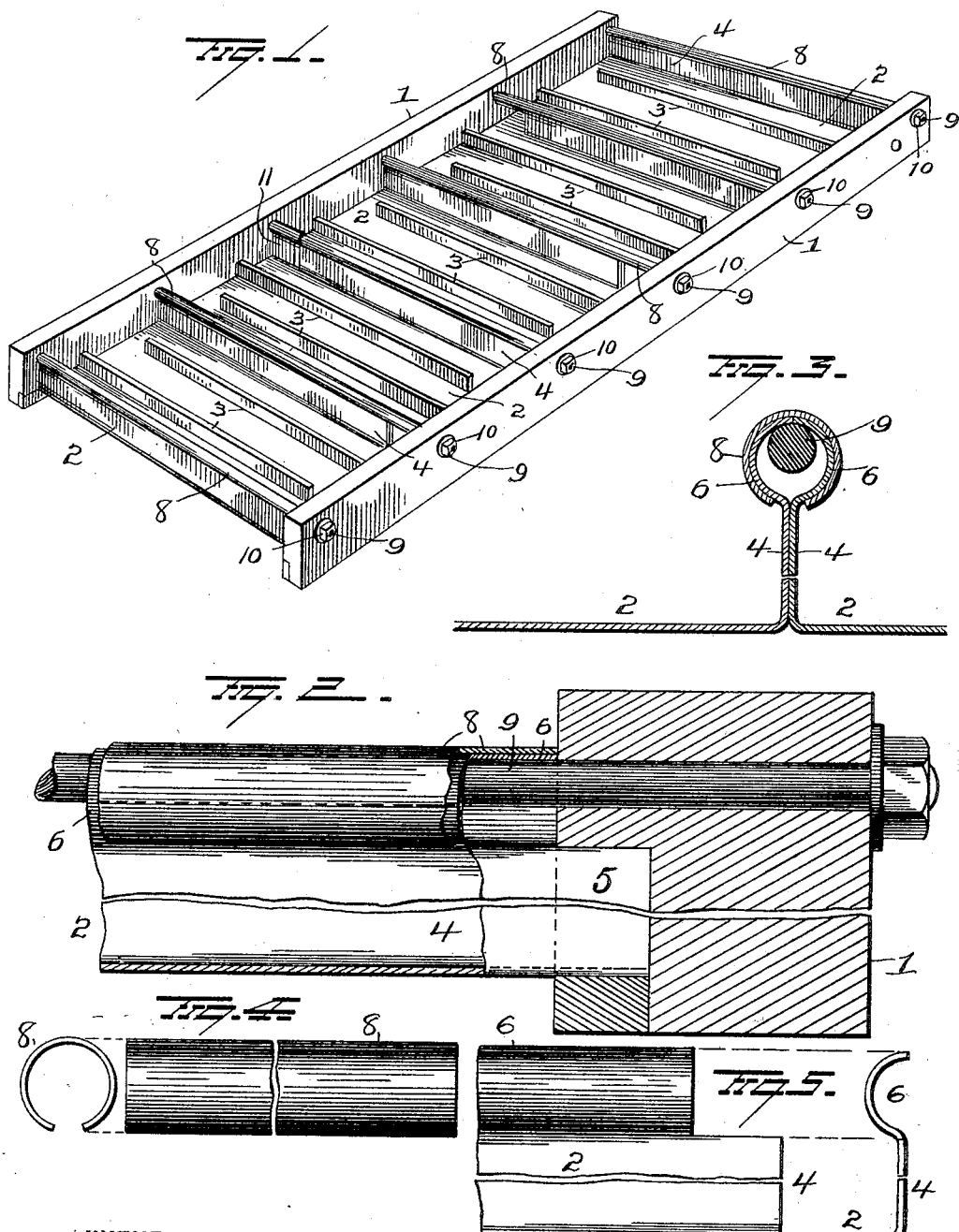

JOHN P. GOLDEN, OF COLUMBUS, GEORGIA.

EVAPORATING-PAN.

No. 813,089.   Specification of Letters Patent.   Patented Feb. 20, 1906.

Application filed July 27, 1905. Serial No. 271,486.

*To all whom it may concern:*

Be it known that I, JOHN P. GOLDEN, a resident of Columbus, in the county of Muscogee and State of Georgia, have invented certain new and useful Improvements in Evaporating-Pans; and I do hereby declare the following to be a full, clear, and exact description of the invention, such as will enable others skilled in the art to which it appertains to make and use the same.

My invention relates to improvements in evaporating-pans, the object of the invention being to provide a pan having improved connection between its sections and strongly brace the side timbers, resulting in a pan which will be strong and durable, comparatively cheap to manufacture, and which will not sag or become uneven or in which the side timbers cannot warp or get out of position.

With these objects in view the invention consists in certain novel features of construction and combinations and arrangements of parts, as will be more fully hereinafter described, and pointed out in the claim.

In the accompanying drawings, Figure 1 is a perspective view illustrating my improvements. Fig. 2 is an enlarged fragmentary view in cross-section. Fig. 3 is an enlarged sectional view through the joined or coupled sections of the pan, and Figs. 4 and 5 are enlarged detail views.

1 represents the side timbers of the pan, and 2 the separate sections secured together and to timbers 1. Each section 2 is made with intermediate partitions 3, terminating short of the ends of the sections to compel a circuitous passage of the juice, and the edges of the sections are bent up, forming flanges 4, having extended tongues 5 at their ends to enter recesses in timbers 1. The upper edges of flanges 4 are curved into semicylindrical form, as shown at 6, and when two sections are together form a tubular enlargement to receive an open spring locking-cylinder 8, securely locking the sections together. Rods 9 are passed through this tubular coupling and through the timbers 1 and secured by nuts 10, said rods serving to rigidly secure the side timbers and pan-sections together, preventing sagging of the pan-sections and preventing warping of the timbers, as a strengthening-rod is located at the juncture of all pan-sections as well as at the ends of the pan. These coupled flanges of the pan-sections have openings provided at their ends, to be closed by doors 11, which latter when open permit a circuitous passage of the juice from end to end of the pan.

Slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

In a device of the character described, the combination of side timbers, pan-sections, flanged edges on the pan-sections of semicylindrical form at their upper edges and having tongues at their ends located in recesses in the timbers, open coupling-cylinders on the curved adjacent flanges and brace-rods passed through all of said cylinders thus formed and through the timbers, and nuts on said rods.

In testimony whereof I have signed this specification in the presence of two subscribing witnesses.

JOHN P. GOLDEN.

Witnesses:
J. W. SPARKS, Jr.,
N. L. DUDLEY.